United States Patent
Gil et al.

(10) Patent No.: US 7,860,951 B2
(45) Date of Patent: Dec. 28, 2010

(54) INTERNET SESSION INITIATION ON PERSONAL CELLULAR TELECOMMUNICATIONS DEVICES, AND CUSTOMIZATION PROTOCOL THEREFOR

(75) Inventors: Amit Gil, Yehud (IL); Avi Primo, Ramat Gan (IL); Ran Wellingstein, Herzliya (IL)

(73) Assignee: Celltick Technologies, Ltd., Herzliya (IL)

( * ) Notice: Subject to any disclaimer, the term of this patent is extended or adjusted under 35 U.S.C. 154(b) by 1272 days.

(21) Appl. No.: 10/467,913

(22) PCT Filed: Feb. 19, 2002

(86) PCT No.: PCT/IL02/00127

§ 371 (c)(1), (2), (4) Date: Aug. 14, 2003

(87) PCT Pub. No.: WO02/067538

PCT Pub. Date: Aug. 29, 2002

(65) Prior Publication Data

US 2004/0078427 A1 Apr. 22, 2004

(30) Foreign Application Priority Data

Feb. 22, 2001 (WO) .................. PCT/IL01/00165
May 14, 2001 (WO) .................. PCT/IL01/00424
Dec. 5, 2001 (IL) ........................... 146932

(51) Int. Cl.
G06F 15/177 (2006.01)
(52) U.S. Cl. ............... 709/220; 709/221; 709/222
(58) Field of Classification Search ............ 709/250, 709/220–222; 455/414.1, 414.2, 414.3, 419
See application file for complete search history.

(56) References Cited

U.S. PATENT DOCUMENTS

| | | | |
|---|---|---|---|
| 5,553,314 A | 9/1996 | Grube et al. | 455/54.2 |
| 6,275,692 B1* | 8/2001 | Skog | 455/414.3 |
| 6,493,871 B1* | 12/2002 | McGuire et al. | 717/173 |
| 6,560,604 B1* | 5/2003 | Fascenda | 707/10 |
| 6,654,762 B2* | 11/2003 | Cheng et al. | 707/102 |
| 7,328,030 B2* | 2/2008 | Laursen et al. | 455/466 |
| 2002/0034190 A1* | 3/2002 | Baratz et al. | 370/450 |
| 2002/0069263 A1* | 6/2002 | Sears et al. | 709/218 |
| 2003/0114149 A1* | 6/2003 | Lehtonen et al. | 455/418 |

FOREIGN PATENT DOCUMENTS

| | | |
|---|---|---|
| EP | 0 685 972 A2 | 4/1995 |
| WO | WO 99/41931 | 8/1999 |
| WO | WO 01/22680 A2 | 3/2001 |

OTHER PUBLICATIONS

"3rd Generation Partnership Project; Technical Specification Group Terminals; USIM Application Toolkit (USAT)" 3GPP TS 31.111 V3.3.0 (Dec. 2000).*

* cited by examiner

Primary Examiner—Benjamin R Bruckart
Assistant Examiner—Noel Beharry
(74) Attorney, Agent, or Firm—Pearl Cohen Zedek Latzer, LLP (57) ABSTRACT

A customizable client application capable of running on all seven classes of Internet-enabled personal cellular telecommunications devices whose Internet browser launching capabilities range from being Class 0 non Internet-enabled to Class 6 automatic Internet browser launching. The client application facilitates minimum subscriber intervention for Internet session initiation from an Internet session option of an interactive display message.

22 Claims, 7 Drawing Sheets

```
IN THE CASE OF A CLASS 3 WAP-ENABLED DEVICE, ON
SUBSCRIBER ACTIVATION OF THE WAP SESSION OPTION OF
A PARTICULAR INTERACTIVE DISPLAY MESSAGE ON HIS WAP-
ENABLED DEVICE, HIS WAP-ENABLED DEVICE TRANSMITS A
WAP PUSH SI MESSAGE TO ITSELF WHEREUPON SUBSCRIBER
ACTIVATION OF THE SI MESSAGE LAUNCHES ITS WAP
BROWSER TO THE TARGET WAP PAGE DESTINATION
```

↓

```
IN THE CASE OF A CLASS 4 WAP-ENABLED DEVICE, ON
SUBSCRIBER ACTIVATION OF THE WAP SESSION OPTION OF
A PARTICULAR INTERACTIVE DISPLAY MESSAGE ON HIS WAP-
ENABLED DEVICE, HIS WAP-ENABLED DEVICE TRANSMITS A
WAP PUSH SL MESSAGE TO ITSELF WHEREUPON RECEIPT
OF THE SL MESSAGE LAUNCHES ITS WAP BROWSER TO
THE TARGET WAP PAGE DESTINATION
```

↓

```
IN THE CASE OF A CLASS 5 WAP-ENABLED DEVICE, ON
SUBSCRIBER ACTIVATION OF THE WAP SESSION OPTION OF
A PARTICULAR INTERACTIVE DISPLAY MESSAGE ON HIS WAP-
ENABLED DEVICE, HIS WAP-ENABLED DEVICE TRANSMITS A
SMS TO ITSELF FOR DISPLAY OF THE TEXT URL OF THE
TARGET WAP PAGE DESTINATION WHEREUPON SUBSCRIBER
ACTIVATION OF THE TEXT URL LAUNCHES ITS WAP BROWSER
TO THE TARGET WAP PAGE DESTINATION
```

↓

```
IN THE CASE OF A CLASS 6 WAP-ENABLED DEVICE, ON
SUBSCRIBER ACTIVATION OF THE WAP SESSION OPTION OF
A PARTICULAR INTERACTIVE DISPLAY MESSAGE ON HIS
WAP-ENABLED DEVICE, ITS WAP BROWSER AUTOMATICALLY
LAUNCHES TO THE TARGET WAP PAGE DESTINATION
```

↓

( END )

INTERNET SESSION INITIATION ON PERSONAL CELLULAR TELECOMMUNICATIONS DEVICES, AND CUSTOMIZATION PROTOCOL THEREFOR

FIELD OF THE INVENTION

The invention in the field of mobile cellular telecommunications in general, and Internet session initiation on personal cellular telecommunications devices in particular, and a customization protocol therefor.

BACKGROUND OF THE INVENTION

In Applicant's WO 01/52558 A2 entitled "Method for Operating a Cellular Telecommunications Network, and Method for operating a Personal Cellular Telecommunications Device" and WO 01/52572 A1 entitled "Method for Operating a Cellular Telecommunications Network", the contents of which are incorporated herein by reference, there is illustrated and described a screen saver application for displaying display messages on personal cellular telecommunications devices in a screen saver like manner, namely, their display is temporarily interrupted during, say, a voice call, an Internet session, and the like. The display messages are preferably so-called "interactive display messages" in the sense that a subscriber can automatically activate a Point-To-Point (PTP) transmission response mechanism from a dedicated response means integrally provided in a display message. Interactive display messages are preferably transmitted over a Point-To-MultiPoint (PTMP) transmission capability as opposed to over a PTP transmission capability due to bandwidth constraints, server constraints, and the like. But it is envisaged that certain typically high value content, for example, financial highlights, traffic news, and the like, will be transmitted to selected subscribers over a PTP transmission capability.

With the advent of Internet-enabled personal cellular telecommunications devices (hereinafter referred to as "Internet-enabled devices"), an interactive display message typically includes inter alia an Internet session option. However, the installed base of personal cellular telecommunications devices include both non Internet-enabled devices and Internet-enabled devices having different Internet browser launching capabilities for setting up an Internet session. Moreover, many personal cellular telecommunications device cannot be directly interrogated by a client application, for example, Applicant's screen saver application, for determining their Internet browser launching capability, thereby precluding the provisioning of a universally supported client application on the installed base of personal cellular telecommunications devices. Furthermore, matters are still further complicated since in some personal cellular telecommunications devices client applications run on a replaceable smart card residing in a Mobile Equipment (ME). Thus, implementing a client application, for example, Applicant's screen saver application, on the installed base of personal cellular telecommunications devices requires solving severe problems, and all the more so when interactive display messages are transmitted over a PTMP transmission capability.

EP 0 685 972 entitled "Mobile Communication System and Method Therefor" and WO 99/41931 entitled "Server Request including Code for Customizing Service to Requesting Mobile Station" both illustrate and describe harmonization procedures for harmonizing service to a personal cellular telecommunications device as provided by a mobile cellular telecommunications network operator commensurate with the feature set supported by the personal cellular telecommunications device. In EP 0 685 972, a network initiates a handshake with a personal cellular telecommunications device whereby the latter enables a feature of its feature set if supported by the network. In WO 99/41931, a personal telecommunications device initiates a request for service including identification information, and the resulting service to the personal cellular telecommunications device is commensurate with its feature set as determined by its identification information.

SUMMARY OF THE INVENTION

For the purpose of the present invention, personal cellular telecommunications device are classified in terms of their Internet browser launching capabilities into seven classes as follows:

Class 0 Internet-enabled devices which are in fact non-Internet enabled.

Class 1 Internet-enabled devices which require the time consuming and cumbersome input of the text (Uniform Resource Locator) URL of a Web page into an Internet browser's address field before it can be launched to the Web page.

Class 2 Internet-enabled devices which support Over The Air (OTA) Internet browser settings stored as Bookmarks whereby, on configuration of a new Bookmark, a subscriber can launch his Internet browser to the Web page designated in the new Bookmark stored as either the Internet browser's default home page or a standard bookmark.

Class 3 Internet-enabled devices which support a so-called push capability whereby, on receipt of a data message with the text URL of a Web page embedded therein, a subscriber can launch his Internet browser from the data message to the Web page.

Class 4 Internet-enabled devices which support a more aggressive push capability than a Class 3 Internet-enabled device insofar that an Internet browser is automatically launched to the Web page on receipt of a data message with the text URL of a Web page embedded therein.

To date, Class 3 and 4 Internet-enabled devices are only WAP enabled, however, it is expected that similar push capabilities will be provisioned in other technologies. In the case of a Class 3 WAP-enabled device, the data message is known as a Service Indication (SI) Message whilst in the case of a Class 4 WAP-enabled device, the data message is known as a Service Load (SL) message.

Class 5 Internet-enabled devices which support a so-called URL recognition capability, for example, as implemented in Ericsson's R320 phone whereby, on receipt of a SMS for display of the text URL of a Web page, subscriber activation of the text URL launches his Internet browser to the Web page.

Class 6 Internet-enabled devices which support automatic Internet browser launching to a Web page by an application through a standard Application Program Interface (API). In particular, support of a SAT (SIM Application Toolkit) pro-active Launch Browser command standardized under 3GPP's Technical Standard (TS) 31.111 entitled "$3^{rd}$ Generation Partnership Project; Technical Specification Group Terminals; USIM Application Toolkit (USAT)" renders an exemplary Class 6 Internet-enabled device enabling Internet sessions. ME support of the SAT pro-active Launch Browser command is indicated in an information field of a so-called Terminal Profile downloaded from a host ME to a smart card under a Profile Download procedure also standardized in the above-mentioned TS.

Generally speaking, the present invention is for a customizable client application capable of running on all seven classes of Internet-enabled personal cellular telecommunications devices whose Internet browser launching capabilities range from being Class 0 non Internet-enabled to Class 6 automatic Internet browser launching. The client application facilitates minimum subscriber intervention for Internet session initiation from an Internet session option of an interactive display message, and in the case of Class 0 non Internet-enabled devices, an Internet session option is preferably deleted from a menu of PTP transmission response mechanism options of an interactive display message. The interactive display messages preferably include the full text URL of a target Web page destination to facilitate efficient Internet browser launching. However, in the case of a particularly long URL, for example, http://www.amazon.con/exec/obidos/wishlist/ref=nwl_shopping/103-2947502-5237400 for launching to amazon.com's wish list page, the target Web page destination is preferably a Web page at a proxy Website, for example, http://www.celltick.com/000134 where 000134 specifies the Web page. The Web page at the proxy Website can either duplicate the true target Web page destination, in this case, amazon.com's wish list page, or it can automatically reroute an Internet browser thereto.

The customization is preferably achieved by way of a customization protocol suitable for providing details regarding a wide range of features of the feature set of an Internet-enabled device other than its Internet browser launching capability, for example, screen size, and the like. The customization protocol is implementable since all MEs are provided as a matter of course with a unique vendor allocated identification numbers, for example, a GSM/DCS/PCS personal cellular telecommunications device's 15 digit International Mobile Equipment Identification (IMEI) number. An ME's identification number can be employed for interrogating an Equipment Technical Specification Register (ETSR) typically sorted by ME configuration types in terns of hardware and software release as applicable to a population of at least two MEs, and typically numbering several tens of thousands of MEs, and upwards. Moreover, the ME configuration types are preferably not vendor specific but rather cut across the model lines of two or more ME vendors whereby two or more ME models of different ME vendors may have the same ME configuration type.

Thus, the customization protocol can be employed for supplementing an existing Terminal Profile, for example, as standardized under the aforementioned standard, and also for obtaining information regarding a host ME which is already included in a Terminal Profile but which is known to be inaccurate. Since newer MEs typically download a more comprehensive Terminal Profile than older MEs, the same client application may need to request more information about the feature set of an earlier ME than a newer ME. Typically, a client application only requests information regarding its host ME once regardless of its host ME's powering down and Up.

Looking to the future, it is envisaged that each ME will be provided by its vendor with an industry recognized ME Configuration Type Number for specifying its configuration type, thereby precluding the need for an intermediate step before interrogation of the ETSR. Similarly, it is envisaged that in time each personal cellular telecommunications device will be provisioned with an information field indicating its class of Internet browser launching capability.

The personal cellular telecommunications devices can include a wide range of mobile handheld devices including inter alia simple phones, Smartphones, Communicators, Wireless Information Devices (WIDs), and the like, and dual technology devices, for example, including a GSM transceiver and a Bluetooth transceiver. The client applications can be developed under different industry wide and proprietary development environments, and can run on different Operating Systems (O/Ss) including inter alia Microsoft CE, Symbian EPOC, Palm O/S, and the like. Also, the present invention applies to all mobile Internet based technologies including inter alia HTML, Compact HTML, WAP, and others.

BRIEF DESCRIPTION OF THE DRAWINGS

In order to understand the present invention and to see how it can be carried out in practice, preferred embodiments will now be described, by way of non-limiting examples only, with reference to the accompanying drawings, in which similar parts are likewise numbered, and in which.

DETAILED DESCRIPTION OF THE DRAWINGS

Figure 1:
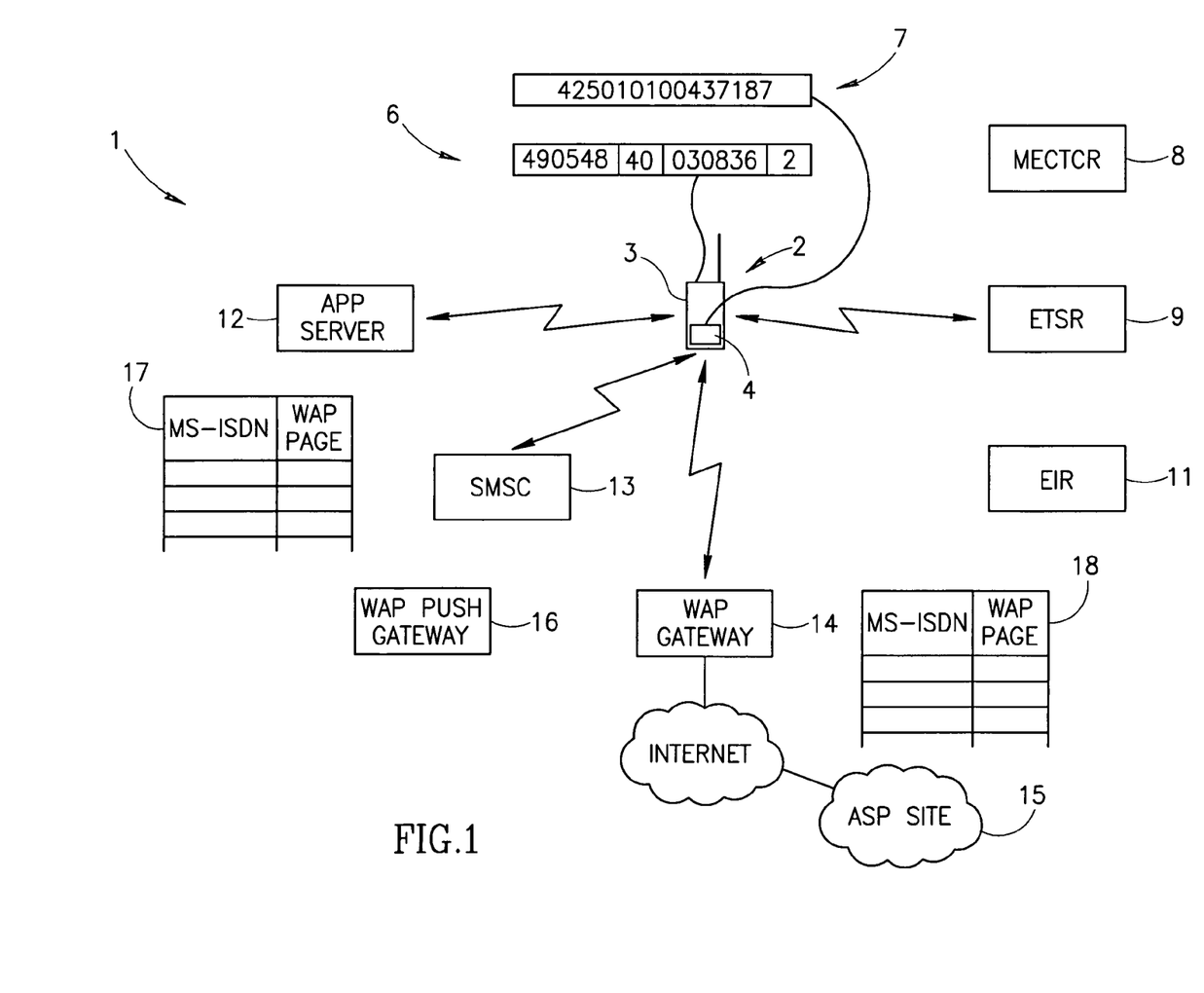
FIG. 1 shows a schematic representation of a GSM mobile cellular telecommunications network for supporting a customizable client application for WAP session initiation from interactive display messages displayed on WAP-enabled devices.

FIG. 1 shows a GSM cellular telecommunications network 1 for enabling WAP session initiation from a WAP-enabled device 2 in general, and from WAP session option dedicated response means of interactive display messages displayed thereon in particular. The WAP-enabled device 2 has a MS-ISDN mobile telephone associated therewith, and includes a host Mobile Equipment (ME) 3, and a resident Subscriber Identity Module (SIM) card 4 capable of running SIM Toolkit applications (constituting client applications). The host ME 3 has its own unique vendor allocated 15 digit International Mobile Equipment Identification (IMEI) number 6, for example, 490548400308362, including four fields as follows: a six digit Type Approval Code (TAC), a two digit Final Assembly Code (FAC), a six digit Phone Serial Number, and a single digit Additional Number. The SIM card 4 has a cellular operator allocated 15 digit International Mobile Subscriber Identity (IMSI) number 7, for example, 425010100437187. The WAP-enabled device 2 has a WAP browser with a default WAP home page and/or one or more Bookmark WAP pages (a default WAP home page or a Bookmark WAP page both constituting a predefined Web page destination). The WAP-enabled device 2 may also have a cache memory for storing the first received content for each of one or more URLs, namely, its home page, and the like. The cache memory is responsive to one or more commands which may be embedded in such content, for example, not to cache content, to immediately delete content, and the like.

Figure 2:
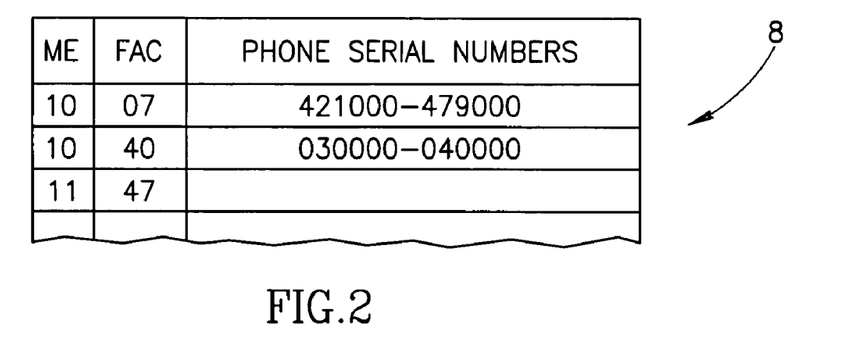
FIG. 2 shows a portion of an ME Configuration Type Conversion Register (MECTCR) for identifying the ME configuration type of a WAP-enabled device on the basis of a portion of its IMEI.number.
Figure 3:
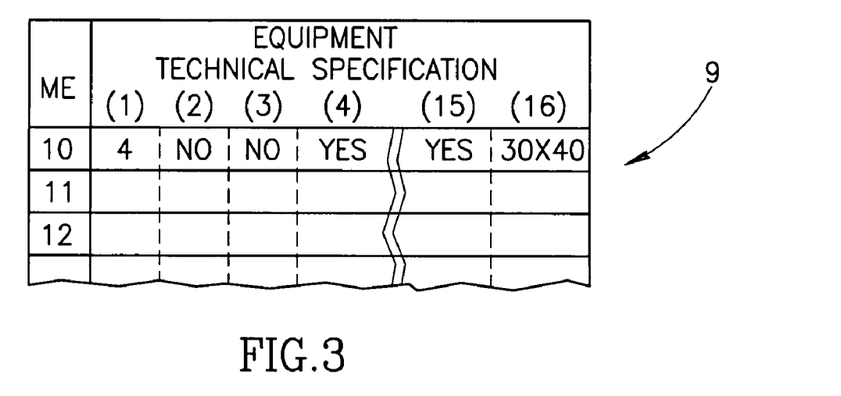
FIG. 3 shows a record of an Equipment Technical Specification Register (ETSR) specifying technical information in respect of a particular ME configuration type.

For the purpose of customization of a customizable client application, the network 1 includes two registers as follows: First, a ME Configuration Type Conversion Register (MEC-TCR) 8 for determining the ME configuration type of a particular host ME from its FAC and Phone Serial Number (see FIG. 2). And second, an Equipment Technical Specification Register (ETSR) 9 sorted by ME Configuration Type Number and covering a wide range of past and currently available ME configuration types (see FIG. 3). The ETSR 9 includes technical information in various forms, called a feature set, and including inter alia YES/NO information fields in respect of certain features, for example, a host ME's WAP browser launching capability; numerical values in respect of other features, for example, screen size; text; and the like. For illustrative purposes, FIG. 3 shows that the ME configuration type 10 is a Class 4 type WAP-enabled device (Feature 1), and has a 30.times.40 screen size (Feature 16). Optionally, the customization protocol may employ an existing Equipment Identification Register (EIR) 11 listing all the MEs in the installed base of personal cellular telecommunications devices by their IMEI numbers, and their corresponding SIM cards by their IMSI numbers for monitoring purposes, for example, for barring service to stolen equipment (see FIG. 4).

For the purpose of enabling WAP browser launching from an interactive display message with a WAP session option dedicated response means, the network 1 includes an application server 12 including a database for storing records of interactive display messages (see FIG. 5), a Short Message Service Center (SMSC) 13, a WAP gateway 14 to the Internet cloud including an Active Server Page (ASP) site 15 for effecting a WAP walkaround for use by Class 1 WAP-enabled devices 2, and a WAP push gateway 16 for use by Class 3 and Class 4 WAP-enabled devices 2. The network 1 includes a dynamic database 17 for listing subscribers who have activated WAP session option dedicated response means, and the text URLs of the target Web page destinations of their WAP browsers. The WAP gateway 14 includes a dynamic buffer 18 similar to the dynamic database 17 but for listing all subscribers engaging in active WAP sessions, and the text URLs of the actual Web page destinations of their WAP browsers. Each subscriber engaged in a WAP session is typically listed by his MS-ISDN but alternatively other identification numbers associated with his WAP-enabled device 2 may be used.

Figure 5:
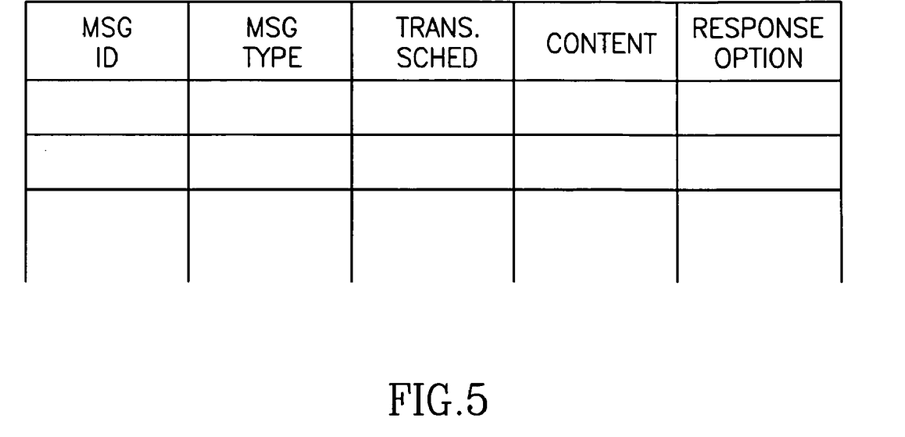
FIG. 5 shows a record of an interactive display message for display on a WAP-enabled device.
Figure 6:
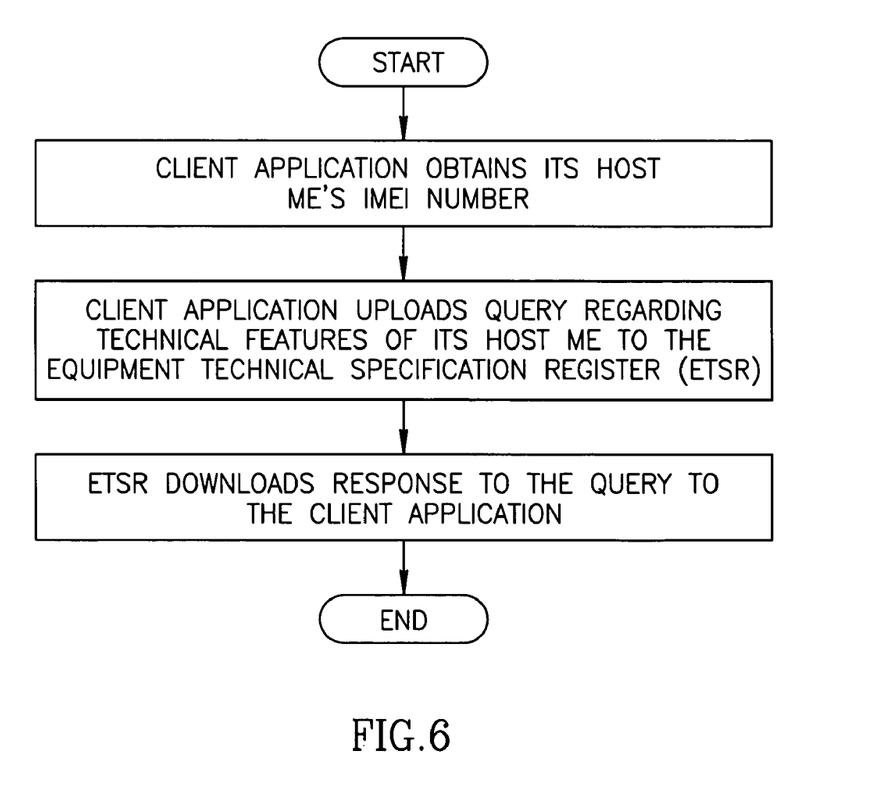
FIG. 6 is a flow diagram of a customization protocol for the customization of a customizable client application.
Figure 7A:
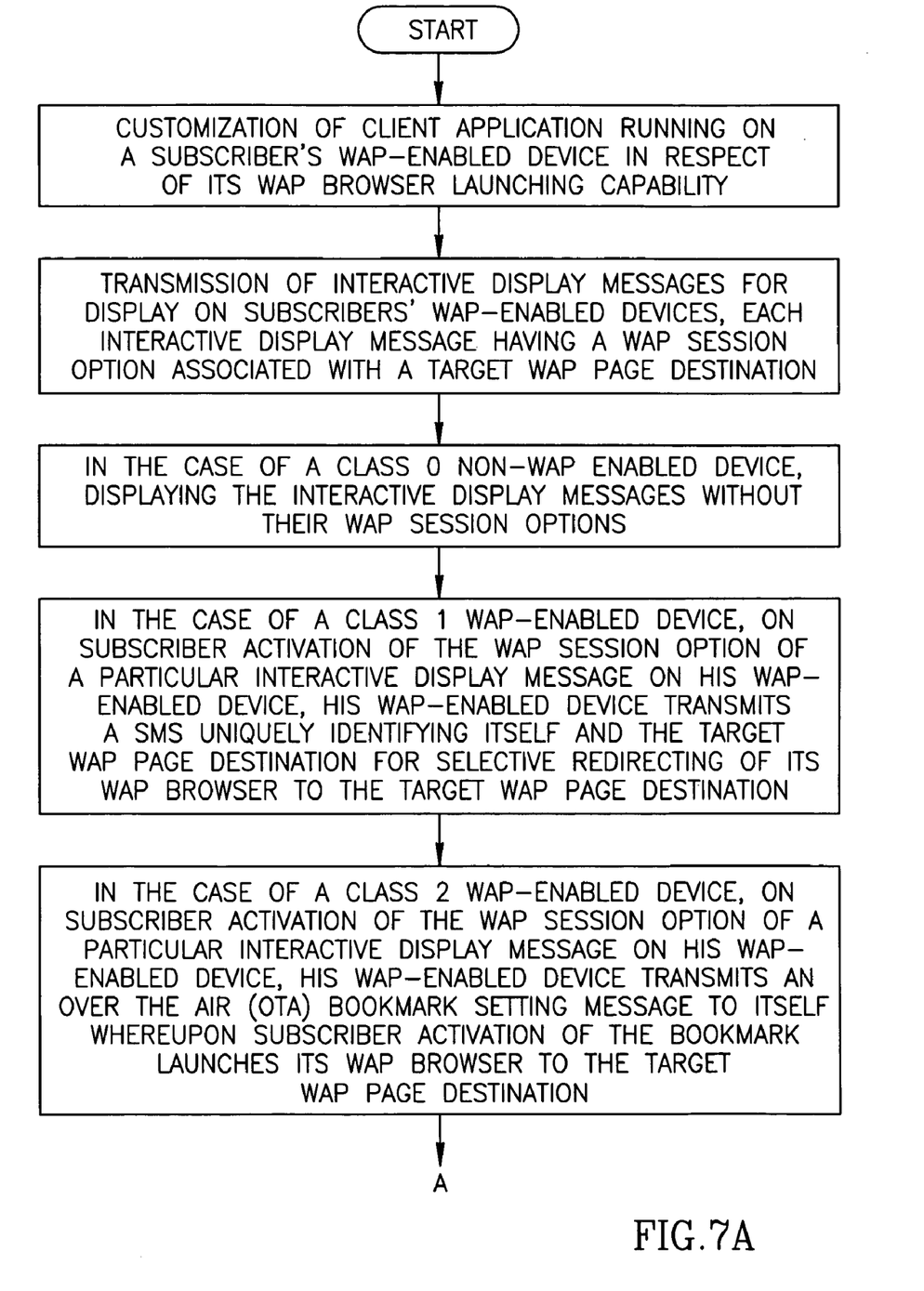
FIG. 7 is a flow diagram of WAP session initiation on each of seven classes of WAP-enabled devices.
Figure 7B:
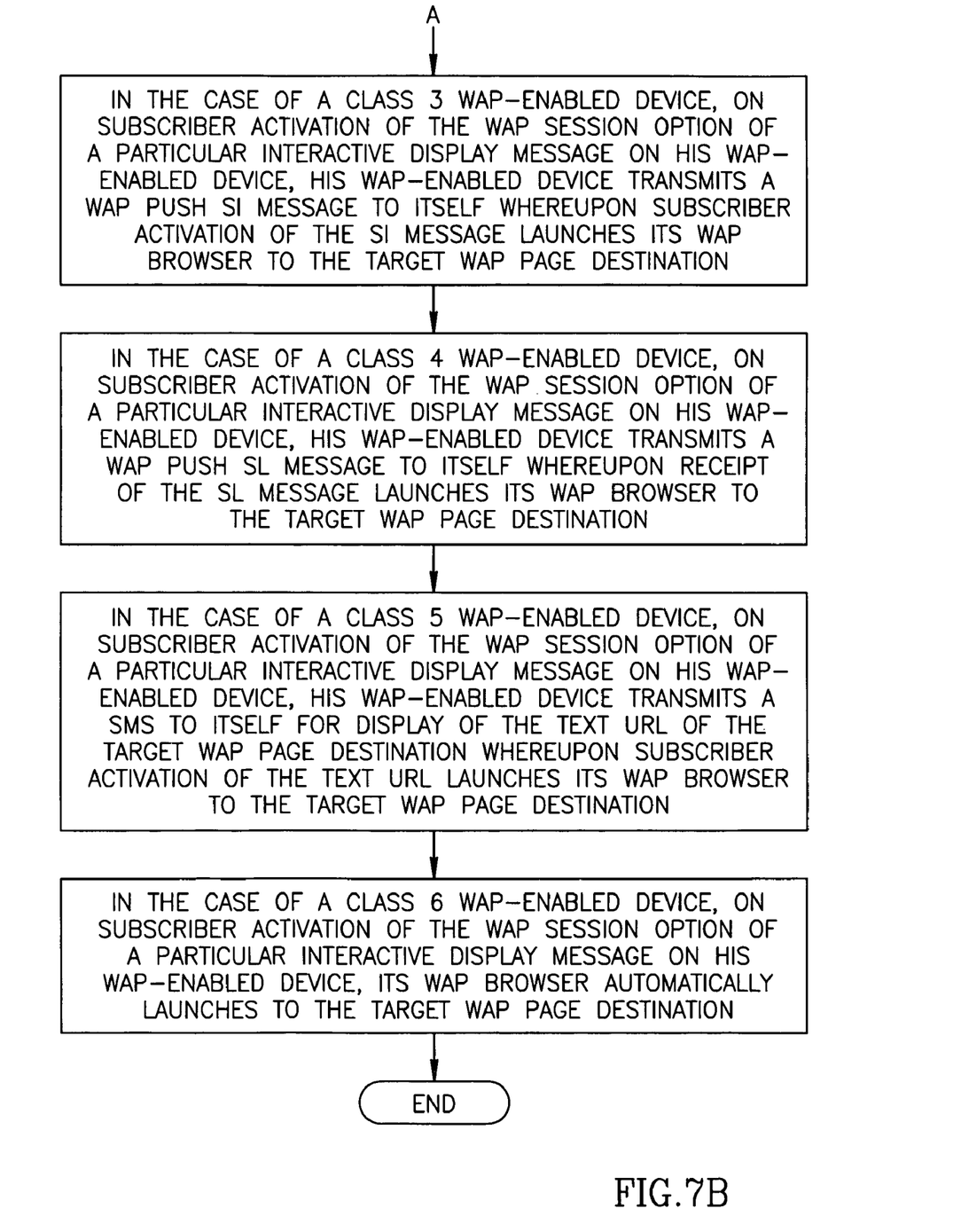

FIG. 5 shows that each record of an interactive display field contains the following fields:

First, a Message Identification field denoted MSG ID for uniquely identifying an interactive display message;

Second, a Message Type field denoted MSG TYPE for specifying a Point-To-MultiPoint (PTMP) type message or a Point-To-Point (PTP) type message and in the case that an interactive display message is of the PTP type, its record also includes a field containing details of the subscribers to which the interactive display message is to be transmitted (not shown);

Third, a CONTENT field containing the content to be displayed on a WAP-enabled device;

And lastly, a RESPONSE OPTIONS field listing the PTP transmission response mechanisms options of the interactive display message including the text URL of a target WAP page destination, and optionally, a voice call, an SMS, and the like.

Figure 8A:
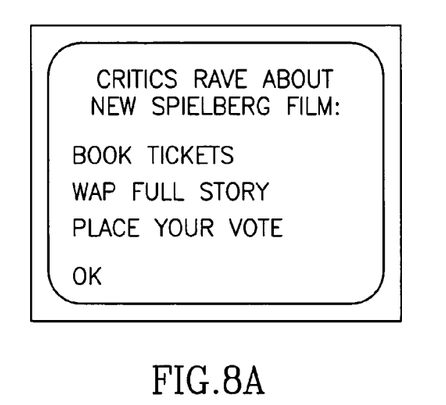
FIGS. 8A-8J are pictorial representations of display screens displayed on different classes of WAP-enabled devices.
Figure 8B:
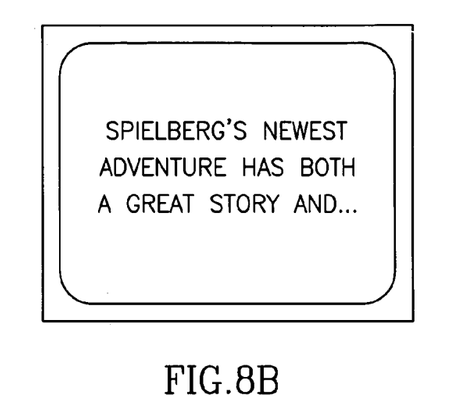

The operation of the GSM mobile cellular telecommunications network is now described in respect of each class of the seven classes of WAP-enabled devices for an interactive display message (see FIG. 8A) offering a WAP session option to read the full story about Spielberg's new film (see FIG. 8B) at a WAP page http://www.newvspielbergfilm.com. In accordance with its prevailing Profile Download procedure, for example, ETSI GSM 11.14 entitled "Digital cellular telecommunications system; Specification of the SIM Application Toolkit for the Subscriber Identity Module—Module Equipment (SIM-ME) interface", the abovementioned 3GPP TS 31.111, and the like, the Terminal Profile is downloaded from the host ME 3 to the SIM card 4. In the case that the WAP-enabled device 2 is a Class 6 WAP-enabled device, the SIM card 4 would be accordingly downloaded that the ME 3 supports the pro-active Launch Browser command standardized under the abovementioned 3GPP TS 31.111. In the case that the WAP-enabled device 2 is not a Class 6 WAP-enabled device, then a customization protocol is then initiated to determine its WAP browser launching capability, if any.

Figure 4:
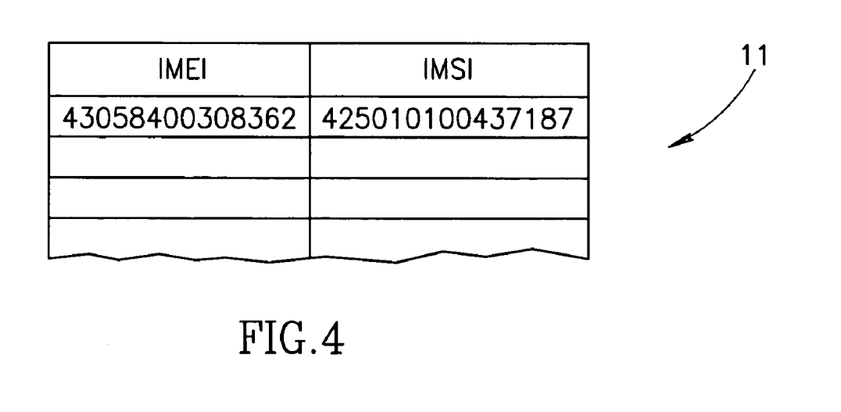
FIG. 4 shows a record of an Equipment Identification Register (EIR) listing IMEI numbers against their corresponding IMSI numbers.

To determine a host ME's WAP browser launching capability and also say its screen size, a client application running on the SIM card 4 directly downloads its host ME's IMEI number 490548400308362 therefrom, and proceeds to strip off its TAC prefix and its Additional Number suffix to leave the ME configuration type distinguishing information 40030836 which is sufficient to uniquely identify its host ME's configuration type. The client application uploads a query to the ETSR 9, the query including the number 40030836, and an additional field specifying Features (1) and (16). The ETSR 9 forwards the number 40030836 to the MECTCR 8 which returns to the ETSR 9 that the host ME belongs to ME configuration type 10. The ETSR 9 determines that the host ME is a Class 4 type WAP-enabled device, and has a 30×40 screen size and returns the values 4 and 30×40 to the client application for its customization. Alternatively, the IMEI number 490548400308362 corresponding to the IMSI number 425010100437187 can be obtained from the EIR 11.

Figure 8C:
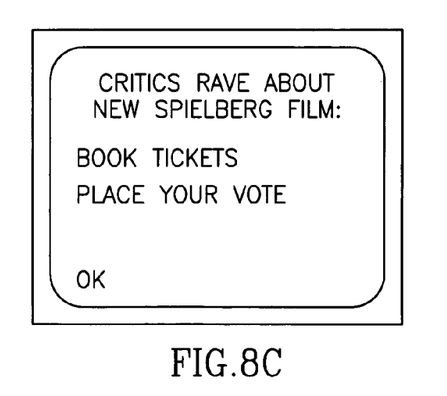
Figure 8D:
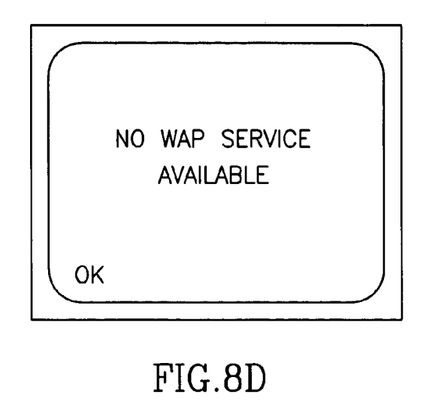

Class 0 non-WAP-enabled device:

On receipt of the interactive display message at a Class 0 WAP-enabled device, the WAP full story option is deleted from the menu of PTP transmission response mechanism options to leave the first and the last options only (see FIG. 8C). Alternatively, if the WAP full story option is not deleted, then in the event that a subscriber activates the WAP full story option, a NO WAP SERVICE AVAILABLE message is displayed (see FIG. 8D).

Figure 8E:
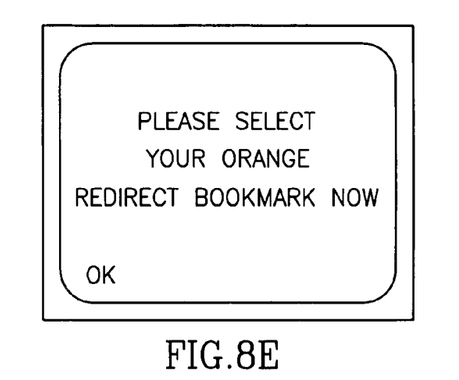
Figure 8F:
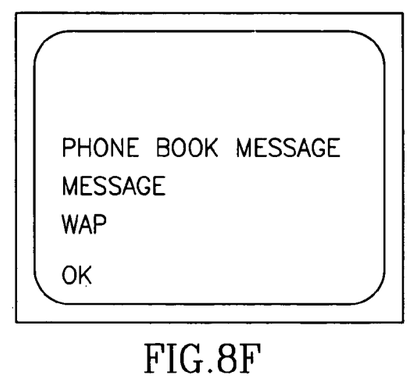
Figure 8G:
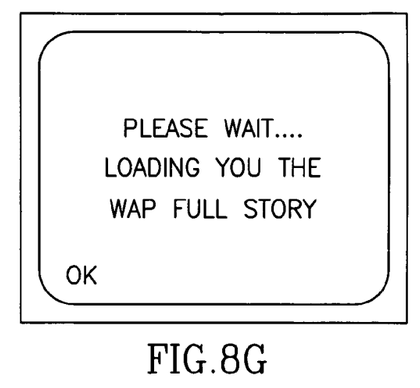

Class 1 WAP-Enabled Device:

In the event that a subscriber activates the WAP full story option of the interactive display message on a Class 1 WAP-enabled device, it transmits a SMS to the application server 12 which updates the dynamic database 17 in respect of the subscriber, and the text URI, of the WAP full story. At the same time, the subscriber is prompted to manually launch his WAP browser to the ASP site 15 preferably stored as a Bookmark, for example, labeled Orange Redirect (see FIG. 8E). Alternatively, the ASP site's URL can be stored as the WAP browser's default WAP home page but more importantly it has no cache memory associated therewith such that his WAP browser is truly launched to the ASP site 15 on each launching rather than merely retrieving content from the cache memory. In the meantime, the application server 12 readies the ASP site 15 to load content to the subscriber's WAP browser including a hypertext link to the WAP full story and suitable commands to ensure that the content is not permanently stored in his device's cache memory. The subscriber navigates to the main menu (see FIG. 8F) before launching his WAP browser to the ASP site 15. On loading the content from the ASP site 15, his WAP browser automatically invokes the hypertext link for its redirection to the WAP full story, thereby rendering a so-called WAP walkaround whilst, in the meantime, his WAP enabled device 2 informs the subscriber that the WAP full story is being loaded (see FIG. 8G). In the case that the subscriber launches his WAP browser to the ASP site 15 after a predetermined timeout T since his activation of the WAP fully story option, his WAP browser is typically redirected to a default WAP page selected by his cellular operator or service provider, for example, his cellular operator's home page, a news portal, and the like.

Alternatively, a WAP walkaround can be achieved without the use of an ASP site 15 by directly interfacing between the application server 12 and the WAP gateway 14 for replacement of the text URL of the predefined WAP page destination of the subscriber's WAP browser with that of the WAP full story at the WAP gateway itself 14 for diverting his WAP browser from its predefined WAP page destination to the WAP full story. As in the former WAP walkaround, in the case that the subscriber launches his WAP browser after the predetermined timeout, it is launched to its default WAP home page destination as if the subscriber had never activated the WAP full story option from the interactive display message.

Figure 8H:
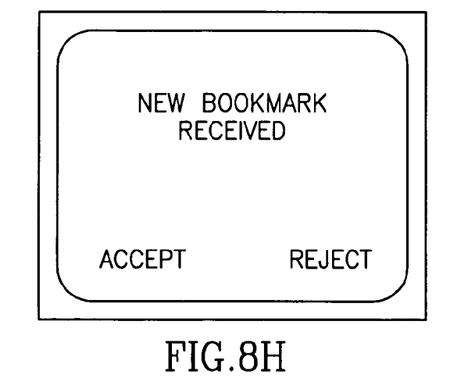

Class 2 WAP-Enabled Device:

In the event that a subscriber activates the WAP full story option of the interactive display message on a Class 2 WAP-enabled device, it transmits an OTA Bookmark setting message to itself with the target WAP page destination embedded therein for inclusion as a Bookmark in the WAP browser. Upon acceptance of the Bookmark setting message (see FIG. 8H) and upon activating the Bookmark, its WAP browser is launched to the WAP full story. Alternatively, the Class 2 WAP-enabled device can send a SMS to the application server 12 for invoking the OTA Bookmark setting message.

Figure 8I:
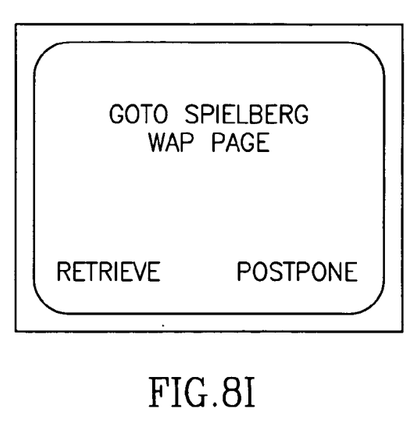

Class 3 WAP-Enabled Device:

In the event that a subscriber activates the WAP full story option of the interactive display message on a Class 3 WAP-enabled device, it transmits a Service Indication (SI) data message to itself with the target WAP page destination embedded therein. Upon receipt of the SI message, it is displayed (see FIG. 8I) and upon activating the retrieval option, its WAP browser is launched to the WAP full story. Alternatively, the Class 3 WAP-enabled device can send a SMS to the application server 12 for invoking the SI message from the WAP push gateway 16.

Class 4 WAP-Enabled Device:

In the event that a subscriber activates the WAP full story option of the interactive display message on a Class 4 WAP-enabled device, it transmits a Service Load (SL) data message to itself with the target WAP page destination embedded therein whereupon on its receipt, its WAP browser is automatically launched to the WAP full story. Alternatively, the Class 4 WAP-enabled device can send a SMS to the application server 12 for invoking the SL message from the WAP push gateway 16.

Figure 8J:
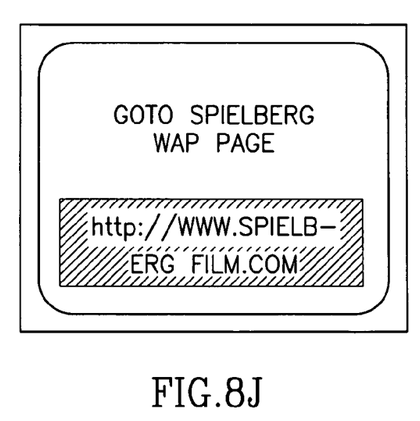

Class 5 WAP-Enabled Device:

In the event that a subscriber activates the WAP full story option of the interactive display message on a Class 5 WAP-enabled device, it transmits a SMS to itself for display of the text URL of the target WAP page destination. Upon receipt of the SMS, the text URL is displayed typically with an instruction to the subscriber (see FIG. 8J) and upon subscriber activation of the text URL, his WAP browser is launched to the WAP full story.

Class 6 WAP-Enabled Device:

In the event that a subscriber activates the WAP full story option of the interactive display message on a Class 6 WAP-enabled device, its WAP browser is automatically launched to the WAP full story.

While the invention has been described with respect to a limited number of embodiments, it will be appreciated that many variations, modifications, and other applications of the invention can be made within the scope of the appended claims. For example, as will now be apparent from the above, albeit that Class 1, 2, 3, 4 and 5 Internet-enabled devices differ in terms of their Internet browser launching capability, they are similar from the client side insofar their Internet browser launching requires the transmission of an outgoing data message. This being the case, rather than the provisioning of a customizable client application capable of running on all seven classes of Internet enabled devices, three versions of the client application can be provided as follows: a version for Class 0 Internet-enabled devices, a version for Class 1, 2, 3, 4, and 5 Internet-enabled devices, and a version for Class 6 Internet-enabled devices. The outgoing data message could then include an information field uniquely identifying a subscriber's Internet-enabled device such that on receipt of a data message therefrom, the network could determine which its class and invoke the walkaround as applicable to Class 1 Internet-enabled devices, or a suitable data message as applicable to Class 2, 3, 4, and 5 Internet-enabled devices.

The invention claimed is:

1. A customization protocol for customizing a customizable client application for use in association with a host Mobile Equipment (ME) of a personal cellular telecommunications device of a set of devices,
    each Mobile Equipment (ME) having a device screen, internet browser capability features and screen features, and each said device receiving cellular service from a service provider,
    the ME having a unique vendor allocated ME identification number, and at least one vendor allocated ME value relating to at least one feature of the ME, said at least one vendor allocated ME value being available for downloading to the customizable client application,
    each host ME supporting a single feature set of at least two different feature sets of features, a subset of MEs of the set of MEs supporting the same feature set of features, the customization protocol comprising the steps of:
    (a) providing a service provider managed Equipment Technical Specification Register (ETSR) for storing service provider allocated technical information regarding a value of at least one feature of at least two different feature sets of features for each ME of the set of MEs, the ETSR being available for independent interrogation by each device of the set of devices, each device hosting the customizable client application for handling incoming messages including display messages for display on the device screen of the host ME;
    (b) automatically downloading from the ME to the customizable client application a vendor allocated ME value of at least one feature of the ME;
    (c) at least partially initially customizing the hosted customizable client application to its associated host ME based on said automatically downloaded vendor allocated ME value;
    (d) receiving by the ETSR a query from a device having said host ME, the query uniquely identifying said associated host ME, whereby the particular values of at least some of the features of said host ME are requested by interrogation of said ETSR based on said identification of said associated host ME;

(e) obtaining the requested values from the ETSR using the identification of the associated host ME; and (f) downloading the obtained service provider allocated ETSR values to the device for assigning each downloaded service provider allocated ETSR value to the corresponding feature in the customizable client application and for customizing the customizable client application with respect to the downloaded service provider allocated ETSR values of its host ME's said feature set of features, each downloaded service provider allocated ETSR value being assigned to a feature to which a vendor allocated ME value was not assigned during said at least initial partial customization and/or replacing a downloaded vendor allocated ME value assigned to a feature during said at least initial partial customization, whereby the customizable client application is customized by the service provider for the particular device hosting the customizable client application independent of how the device is to be used by its user such that the customized client application handles some incoming messages differently in accordance with its customization, and whereby said customization is the same for each ME of a subset of MEs that supports the same feature set of features and a different subset of MEs having a different feature set of features being customized differently.

2. The protocol according to claim 1 wherein a query is uploaded by its associated telecommunications device regardless of its associated ME's powering down and up.

3. The protocol according to claim 1 wherein a query is uploaded by its associated telecommunications device once regardless of its associated originating ME's powering down and up.

4. The protocol according to claim 1 wherein a query is not uploaded on every user initiated non-customization service request.

5. The protocol according to claim 1 wherein the ETSR stores technical information relating to feature sets of features by ME configuration type where at least one ME configuration type is applicable to a population of at least two MEs, and said query includes at least a portion of its associated ME's unique vendor allocated ME identification number for enabling an ME configuration type of its associated ME to be distinguished.

6. The protocol according to claim 1 wherein the ETSR stores technical information relating to feature sets of features by ME configuration type where at least one ME configuration type is applicable to a population of at least two MEs, and said query includes a vendor allocated ME Configuration Type Number for distinguishing an ME configuration type of its associated ME.

7. The protocol according to claim 1 wherein a query determines its associated ME's Internet browser launching capability for customization of a client application handling interactive display messages with an Internet session option.

8. The protocol according to claim 1 wherein a query determines its associated ME's screen size for customization of a client application controlling the display of display messages thereon.

9. The protocol as claimed in claim 1 wherein as a result of said customization, the customized client application displays incoming display messages differently in accordance with its customization.

10. The protocol according to claim 1 wherein the query determines the associated ME's display features for customization of a client application controlling the display of display messages thereon.

11. The protocol according to claim 1 wherein said client application to be customized obtains the identification code from the device hosting it; obtains access to the ETSR; and uploads the query to the ETSR.

12. A customization protocol for customizing a customizable client application for use in association with a host Mobile Equipment (ME) of each one of a set of personal cellular telecommunication devices, each Mobile Equipment (ME) having a device screen, internet browser capability features and screen features, and the ME having a unique vendor allocated ME identification number, and at least one vendor allocated ME value relating to at least one feature of the ME, said at least one vendor allocated ME value being available for downloading to the customizable client application, the customizable client application having a plurality of individual customizable features that together when each is assigned a value can specify certain features of the host ME to the customizable client application, the devices belonging to a set of devices wherein each ME of the set of MEs supports a single feature set of at least two different feature sets of features, a subset of MEs of the set of MEs supporting the same feature set of features, the customization protocol comprising the steps of:

(a) providing a customizable client application hosted on the device, the customizable client application for handling incoming messages including display messages for display on the device screen, and having at least some features to be assigned values to customize the customizable client application to its respective host ME;

(b) identifying the host ME to the hosted customizable client application;

(c) automatically downloading at least one vendor allocated ME value from the ME to the customizable client application for assigning a vendor allocated ME value to at least one feature thereof;

(d) at least partially initially configuring the customizable client application to its host ME based on said at least one automatically downloaded vendor allocated ME value;

(e) obtaining the identification code from the device hosting the client application;

(f) obtaining access to a service provider managed Equipment Technical Specification Register (ETSR) which stores service provider allocated technical information regarding the values of the features of each ME of the set of MEs, wherein the ETSR can be independently interrogated by each device;

(g) uploading a query from one of the devices to the ETSR, the query including the unique identification code of the associated ME;

(h) obtaining the particular values of at least some of the features of said host ME by interrogation of said ETSR based on said identification of said associated host ME;

(i) receiving by the querying device the requested ME values from the ETSR; and (j) assigning each service provider allocated ETSR value to the corresponding feature in the customizable client application, each downloaded service provider allocated ETSR values being assigned to a feature to which a vendor allocated ME value was not assigned during said at least initial partial customization and/or replacing a downloaded vendor allocated ME value assigned to a feature during said at least initial partial customization;

whereby the customizable client application is customized by the service provider for the particular ME of the device hosting the client application independent of the usage of the device by its user such that the customized client application handles some incoming messages differently in accordance with its customization; and whereby said customization is the same for each ME of a subset of MEs that supports the same feature set and a different subset of MEs having a different feature set being customized differently.

13. The protocol as claimed in claim 12 wherein as a result of said customization, the customized client application displays incoming display messages differently in accordance with its customization.

14. The protocol according to claim 12 wherein the query determines the associated ME's Internet browser launching capability; and wherein as a result of said customization, the customized client application handles interactive display messages with an Internet session option in accordance with said customization.

15. The protocol according to claim 12 wherein the query determines the associated ME's display features for customization of a client application controlling the display of display messages thereon.

16. The protocol according to claim 12 wherein said client application to be customized obtains the identification code from the device hosting it; obtains access to the ETSR; and uploads the query to the ETSR.

17. The protocol according to claim 12 wherein a query is uploaded by its associated telecommunications device regardless of its associated ME's powering down and up.

18. The protocol according to claim 12 wherein a query is uploaded by its associated telecommunications device once regardless of its associated originating ME's powering down and up.

19. The protocol according to claim 12 wherein a query is not uploaded on every user initiated non-customization service request.

20. The protocol according to claim 12 wherein the ETSR stores technical information relating to feature sets of features by ME configuration type where at least one ME configuration type is applicable to a population of at least two MEs, and said query includes at least a portion of its associated ME's unique vendor allocated ME identification number for enabling an ME configuration type of its associated ME to be distinguished.

21. The protocol according to claim 12 wherein the ETSR stores technical information relating to feature sets of features by ME configuration type where at least one ME configuration type is applicable to a population of at least two MEs, and said query includes a vendor allocated ME Configuration Type Number for distinguishing an ME configuration type of its associated ME.

22. The protocol according to claim 12 wherein a query determines its associated ME's screen size for customization of a client application controlling the display of display messages thereon.

* * * * *